(12) United States Patent
Cohen et al.

(10) Patent No.: US 6,701,152 B1
(45) Date of Patent: Mar. 2, 2004

(54) METHOD AND SYSTEM FOR ASSIGNMENT OF FIXED SUBSCRIBER UNITS IN WIRELESS LOCAL LOOP SYSTEMS

(75) Inventors: Jonathan Cohen, Tel-Aviv (IL); Tanu Aggarwal, New Delhi (IN); Tadashi Ohmori, Tokyo (JP); Masahiro Mitsuzuka, Kanagawa (JP)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/415,196

(22) Filed: Oct. 7, 1999

(51) Int. Cl.$^7$ ................................. H04Q 7/20
(52) U.S. Cl. ................. 455/453; 455/437; 455/450
(58) Field of Search ................. 455/437, 400, 455/423, 425, 435.2, 525, 403, 436, 452.2, 450, 451, 452.1, 453

(56) References Cited

U.S. PATENT DOCUMENTS

| | | | |
|---|---|---|---|
| 5,697,059 A | * 12/1997 | Carney | |
| 5,765,103 A | 6/1998 | Chang et al. | ............... 455/434 |
| 5,839,075 A | 11/1998 | Haartsen et al. | ............ 455/450 |
| 5,974,320 A | * 10/1999 | Ward et al. | |
| 6,128,480 A | * 10/2000 | Ohmori | |
| 6,175,734 B1 | * 1/2001 | Desgagne et al. | |
| 6,381,462 B1 | * 4/2002 | Charas | |
| 6,400,937 B1 | * 6/2002 | Charas et al. | |

* cited by examiner

Primary Examiner—Sinh Tran
Assistant Examiner—Huy D Nguyen
(74) Attorney, Agent, or Firm—George A. Willman; Felix L. Fischer

(57) ABSTRACT

Method of assigning a fixed subscriber unit (FSU) to communicate with a particular base station and a system including a plurality of wireless FSUs. The system includes a plurality of base stations, which are coupled to a telecommunications network. Each FSU is coupled to a subscriber communication device, and each FSU is configured to communicate wirelessly with at least a base station. The FSU measures signal strength of a set of base stations. The FSU sends a message with the measured signal strength of the set of base stations to a base station. Circuitry coupled to the base station determines at least a base station to which the FSU is to be assigned based on the message and additional information in the circuitry coupled to the base station. In response to the determining by the circuitry coupled to the base station, the base station sends to the FSU a message including the base station to which the FSU is to be assigned.

55 Claims, 13 Drawing Sheets

The sequence chart of location registration when the FSU is powered on

The sequence chart of the transmission

The sequence chart of reporting the information of the surrounding BSs

The sequence chart of periodical location registration

The sequence chart of return to the original BS after the end of the talk transfer The sequence chart of return to the original BS after the end of the talk transfer The sequence chart of return to the original BS after the end of the talk transfer The indicative sequence chart of searching for the other radio BS

METHOD AND SYSTEM FOR ASSIGNMENT OF FIXED SUBSCRIBER UNITS IN WIRELESS LOCAL LOOP SYSTEMS

BACKGROUND OF THE INVENTION

1. Field of the Invention

This invention relates to the field of wireless fixed subscriber units in a telecommunications system. In particular, the invention relates to assignment of fixed subscriber units to base stations.

2. Description of the Related Art

In various areas, particularly in developing countries, wired telephone service is difficult to install in residential buildings, offices and other locations. In such circumstances, telephone service can be provided by installing a radio base station in or near the telephone central office and a radio transceiver, called a fixed subscriber unit (FSU) in or near the subscriber's premises. The radio base station is connected to the local exchange through wires or radio links. The FSU allows the subscriber equipment, such as a common telephone set, to communicate with the telecommunications network by communicating over a radio link with the base station instead of wires. Such a system may be referred to as a wireless local loop (WLL). Even in some areas in which a wired telephone network has been set up, a wireless local loop system may be employed. Details about the wireless local loop system are provided in the Te Kai Ping bulletin issue 9-322254 in Te Biao Ping bulletin issue 9-510377 which is hereby incorporated herein by reference. Telephone sets connected to an FSU can transmit and receive voice signals much like ones connected to a wired network.

Often a system includes a number of different base stations and a number of different FSUs. In various circumstances, such as when an FSU is introduced into a system or is powered on, the FSU must be assigned to a particular base station for communication with the network. In such a circumstance, the FSU must be matched with a particular base station to which it will be assigned. It would be desirable to achieve an efficient assignment of an FSU to a base station and a sufficient communication between the FSU and base station.

SUMMARY OF THE INVENTION

The embodiment of the invention is directed to a method of assigning a fixed subscriber unit (FSU) to communicate with a particular base station in a system including a plurality of wireless FSUs. Each FSU is coupled to a subscriber communication device, and each FSU is configured to communicate wirelessly with at least a base station. The system includes a plurality of base stations, which are coupled to a telecommunications network. The FSU measures signal strength of a set of base stations. The FSU sends a message with the measured signal strength of the set of base stations to a base station. Circuitry coupled to the base station determines at least a base station to which the FSU is to be assigned based on the message and additional information in the circuitry coupled to the base station. In response to the determining by the circuitry coupled to the base station, the base station sends to the FSU a message including the base station to which the FSU is to be assigned.

The additional information in the circuitry coupled to the base station may take various forms. For example the additional information may comprise measured signal strength of base stations sent by FSUs other than the FSU. The additional information in the circuitry coupled to the base station comprises usage patterns in various base stations to which the FSU could be assigned. The additional information in the circuitry may comprise information regarding availability of base stations to additional FSUs.

According to one aspect of the invention, the FSU may periodically measure signal strength of surrounding base stations. The FSU sends a message with measured signal strength to a base station, and in response to the message, the base station sends an updated list of base stations to which the FSU may be assigned.

According to one embodiment to the invention, the FSU maintains a prioritized list of base stations to which the FSU may be assigned. The prioritized list may first be based on measured signal strength of the base stations and then updated in response to a message from the base station. The message from the base station may include a new prioritized list of base stations and the FSU may replace the prioritized list of base stations with the new prioritized list of base stations from the base station. The FSU may attempt to achieve an assignment with the highest prioritized base station on the list, and, if the FSU is not able to achieve the assignment with the highest prioritized base station, the FSU may achieve an assignment with another base station and later attempt to achieve an assignment with the highest prioritized base station.

Another embodiment to the invention is directed to a communications system. The communication system includes a plurality of base stations that are coupled to a telecommunications network. The communication system includes a plurality of subscriber communication devices. The communication system includes a plurality of fixed wireless subscriber units (FSUs). Each subscriber communication device is coupled to an FSU. Each FSU is configured to communicate wirelessly with at least a base station. Each FSU includes circuitry that measures signal strength of a set of base stations and sends a message with the measured signal strength of the set of base stations to a base station. The communication system includes circuitry coupled to the base stations that determines at least a base station to which an FSU is to be assigned based on the message and additional information in the circuitry coupled to the base station. The circuitry causes, in response to the determining, the base station to send to the FSU a message including the base station to which the FSU is to be assigned.

Another embodiment of the invention is directed to an apparatus for use in a telecommunications system. The apparatus has circuitry that determines at least a base station to which a wireless FSU is to be assigned in response to (a) a message from the FSU including measured signal strength of a set of base stations and (b) additional information. The measured signal strength is measured by the FSU. The circuitry also causes a base station communicating with the FSU to send a message including the base stations to which the FSU is to be assigned.

Another embodiment to the invention is directed to a wireless FSU. The FSU includes an interface to a subscriber communication device and a wireless base station interface. The FSU also includes circuitry that measures signal strength of a set of base stations and sends a message with the measured signal strength of the set of base stations to a base station. The circuitry also receives a message from the base station including a base station to which the FSU is to be assigned based on the message sent to the base station and based on additional information. The circuitry attempts to achieve an assignment to the base station sent in the message from the base station.

DETAILED DESCRIPTION

Embodiments of the invention are directed to a fixed subscriber unit, equipment coupled to a base station, and related methods in a telecommunications system using fixed subscriber units (FSUs). A subscriber's equipment is able to communicate with the public switched telephone network (PSTN) by communicating through a FSU, which communicates wirelessly with equipment coupled to the PSTN. An FSU is assigned to communicate wirelessly with a particular base station. Embodiments of the invention are directed to more efficient assignment of an FSU to a base station from among a set of base stations and more efficient communication between an FSU and a base station. For example, according to one embodiment of the invention, an FSU attempts to be assigned to the base station having the greatest signal strength from among various base stations coupled to the network. Later, according to such an exemplary embodiment of the invention, equipment coupled to the base station causes the FSU to be reassigned to a different base station based on more efficient use of base station resources or other resources, or based on other considerations.

Figure 1:
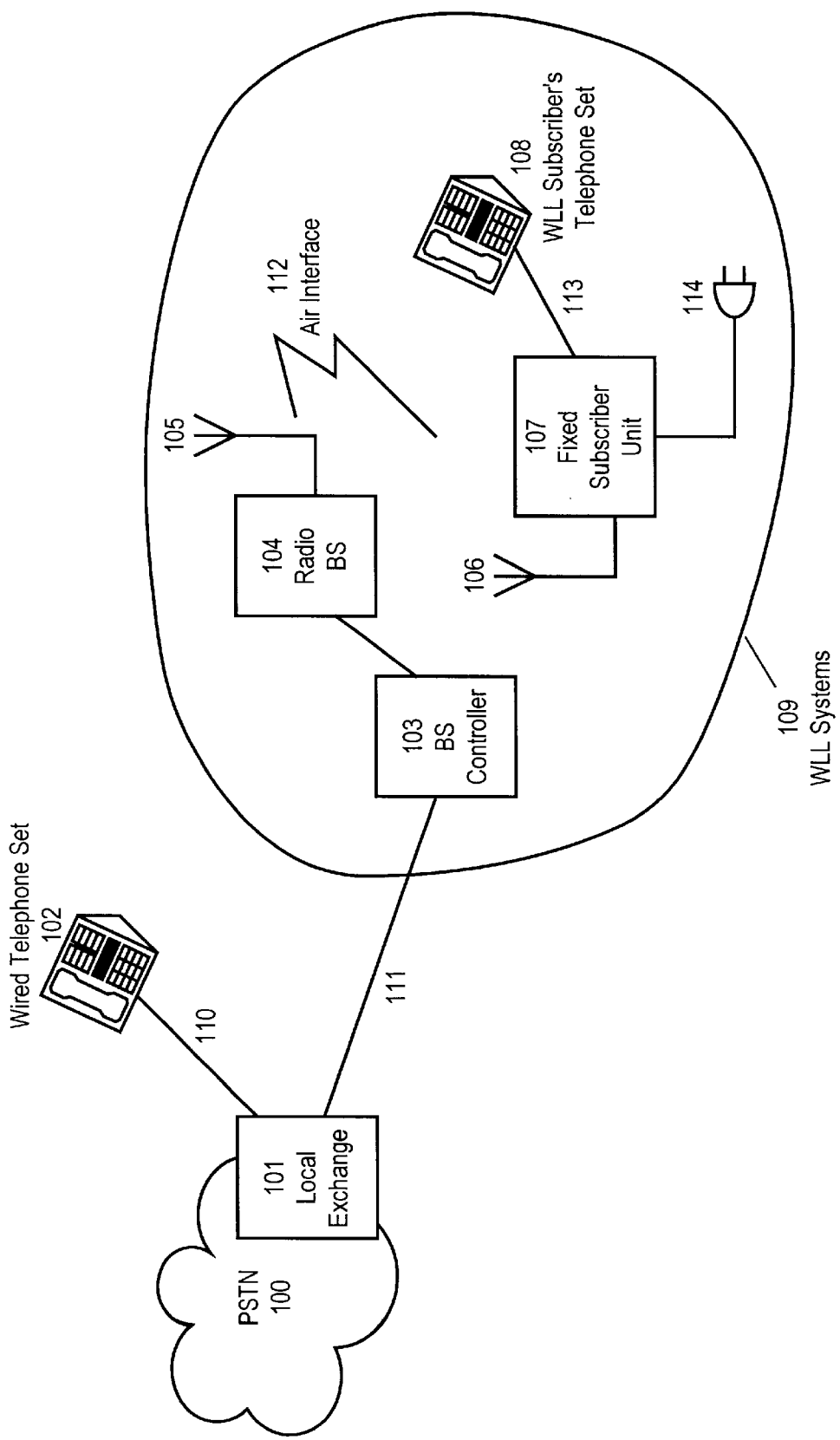
FIG. 1 illustrates a telecommunications system with a fixed subscriber unit, according to an embodiment of the invention.

FIG. 1 illustrates a telecommunications system with a fixed subscriber unit, according to an embodiment of the invention. FIG. 1 shows a single radio base station, radio BS 104, and single fixed subscriber unit (FSU) 107. However, a typical system would contain multiple base stations and multiple fixed subscriber units. An embodiment of the invention helps to assign each fixed subscriber to a base station from among the set of base stations. Local exchange 101 is coupled to the public switched telephone network (PSTN) 100. Local exchange 101 may be coupled to telephone equipment such as a wired telephone set 102 via wired link 110. Local exchange 101 also allows for communication with subscriber equipment that is coupled into the system via a wireless link. As shown, local exchange 101 is coupled to base station controller, BS Controller 103, via link 111. BS Controller 103, is coupled to a base station, radio BS 104, which allows for wireless communication with equipment coupled to subscriber equipment. As shown, radio BS 104, which has antenna 105, communicates via air interface 112 with fixed subscriber unit (FSU) 107, which has antenna 106. FSU 107 is coupled to a subscriber's equipment. As shown here, fixed subscriber unit 107 is coupled to WLL subscriber's telephone set 108. Fixed subscriber unit 107 may be powered with current available at subscriber premises via a plug, such as plug 114.

As noted, a typical configuration includes multiple fixed subscriber units, such as fixed subscriber unit 107 and multiple base stations, such as Radio BS 104. Each fixed subscriber unit is typically assigned to a base station, and may be re-assigned based on the circumstances. Typically, an FSU, such as subscriber unit 107, stores signal strength of various base stations with which it may communicate. The FSU then selects among such base stations and attempts to obtain an assignment to the selected base station. Equipment coupled to the base station may later re-assign the fixed subscriber unit based on one or a variety of considerations.

The following is a brief discussion of the setup of a call with a subscriber using a fixed subscriber unit. When an incoming call arrives from PSTN 100, local exchange 101 selects a route for the call in the local network, and provides an alert signal to the calling user (e.g., ringing tone). Local exchange communicates with BS controller 103, which communicates with the radio BS 104. Radio BS 104 communicates via air interface 112 with fixed subscriber unit 107 in order to alert WLL subscriber's telephone unit 108 if there is an incoming call. An off-hook answering signal is generated by the user at WLL subscriber's telephone set 108, and this signal is detected. Next, connections are established between WLL subscriber's telephone set 108 and the calling party connected to another part of PSTN 100. Eventually, PSTN 100 sends an endcall signal to the opposite local exchange when the call has ended.

In the case of an outgoing call, local exchange 101 detects an off-hook status of the calling user, provides a dial tone, receives a dialing signal from the user, and analyzes the dialing signal. Local exchange 101 detects an answering signal from the remote party, establishes connections between the called party and other parts of PSTN 100, and generates a billing record. Local exchange 101 also provides some auxiliary functions, including call holding, call notifying, conference calls, call transferring, etc.

Wired telephone set 102 may be connected directly to local exchange 101 through metal-wire loop 110, or it may be connected to local exchange 101 through the wireless local loop system 109. A standard type of telephone set, the same as wired telephone set 102, may be used in the wireless local loop system telephone set. The WLL subscriber's telephone set 108 is connected to FSU 107 via a metal wire which has similar electrical characteristics to that of the metal wire local loop 110. FSU 107 acts as a converter between the radio interface 112 and metal wire 113.

The radio interface 112 may apply a variety of radio interface protocols. For example, radio interface 112 may apply to Personal Handyphone System (PHS), DECT, PACS, GSM, AMPS, and other protocols. Additionally, proprietary interfaces may also be supported.

Various interfaces may be used between local exchange 101 and base station controller 103. For example, a digital multiplex interface may be used, the Mercury T1067, Bellcore GR-103, ITU V 5.1 or V 5.2, or other interfaces may be applied.

In general, the following is the process according to one embodiment in the invention of an FSU registering itself with a base station and communicating with that base station or alternate base stations. First, the FSU records signal strength of surrounding base stations. Meanwhile, the base station controller is collecting information from various FSUs regarding signal strength of various base stations. Next, the FSU sends a location registration message to a base station. The base station controller causes the base station to send an accept message or refuse message in response to the location registration message from the FSU. The base station controller also sends a message to the FSU regarding to which base stations the FSU should attempt to be assigned. The FSU is eventually successful in being assigned to a base station, and at this point enters into a waiting state, in which it waits for an incoming call or an attempt by the subscriber to make an outgoing call. In the meantime, the FSU may be required to be assigned to another base station because the original base station may have too much traffic, for example. At this point, the FSU attempts to be assigned to a backup base station based on the relative priority of such base station in a list of base stations maintained by the FSU. Later, the FSU may reattempt to be assigned to the original base station. The FSU also periodically measures signal strength and sends this updated information to the base station controller via the base station to which the FSU is assigned. The base station controller periodically causes the base station to send to the FSU an updated prioritized list of base stations to which the FSU should attempt to be assigned. This prioritized list from the base station controller is based on the measured signal strength measured by the FSU as well as possibly measured signal strength from other FSUs and traffic information regarding traffic in the various base stations.

Figure 2:
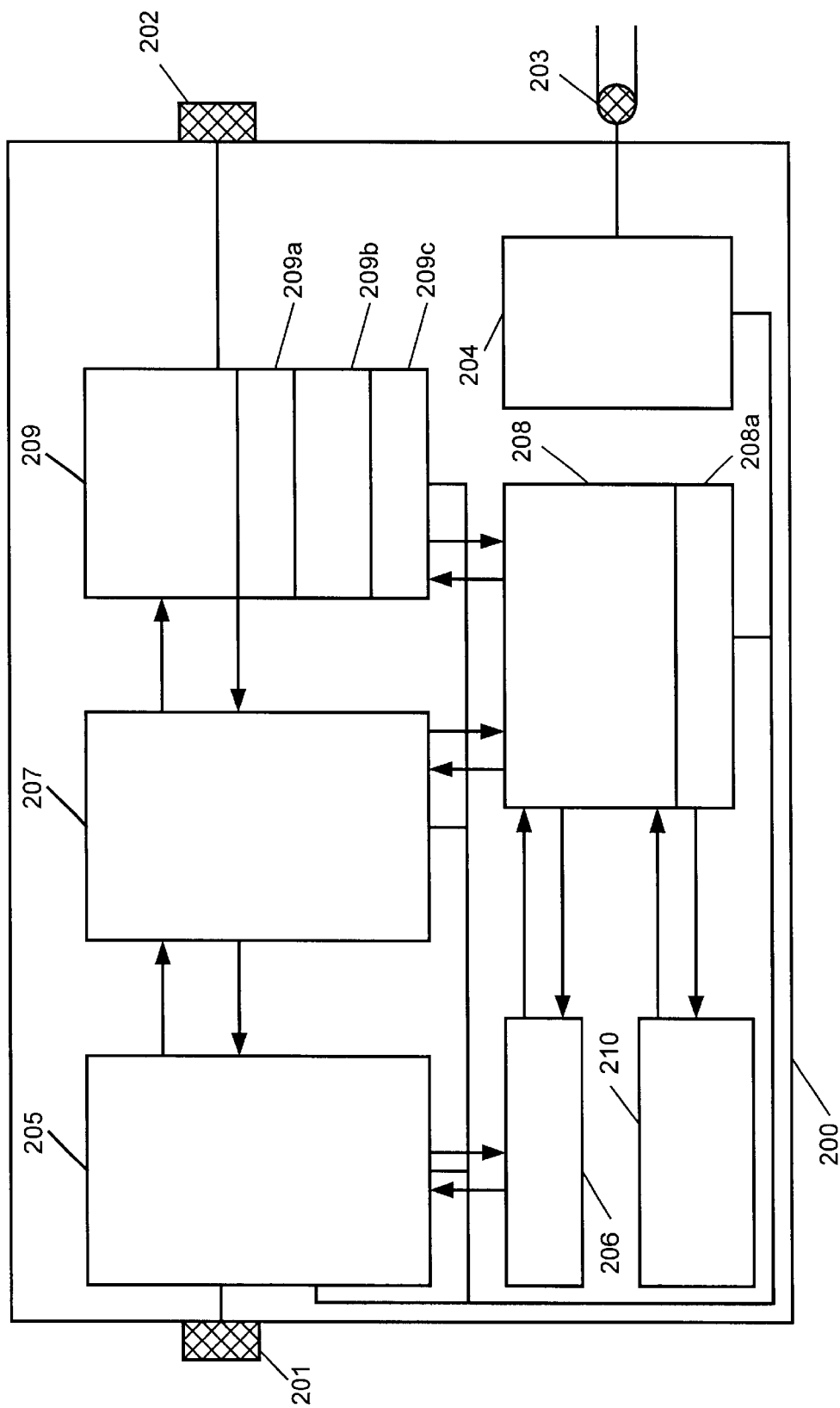
FIG. 2 shows a block diagram of a fixed subscriber unit, according to an embodiment of the invention.

FIG. 2 shows a block diagram of a fixed subscriber unit, according to an embodiment of the invention. The FSU is represented by block 200. The external interfaces on FSU 200 include antenna socket 201 and telephone line socket 202, which are used to conduct the antenna and the user telephone sets respectively. Power line 203 is connected to internal power circuit 204. FSU 200 includes electronic circuit function blocks such as radio circuit 205, radio controller 206, channel codec (coder/decoder), 207, controller 208, telephone line processor 209, and memory 210. Radio circuit 205 generates the desired frequency. Radio circuit 205 receives a command regarding the frequency and times sequence from radio controller 206. Radio circuit 205 also transmits and receives radio data. Controller 206 controls radio circuit 205 and establishes radio communications with the base station.

Channel codec 207 is used to synthesize and resolve data that are received and transmitted through the control and traffic channels of the air interface. Data used in the traffic channel are composed of information processed by control unit 208. The voice data are not transmitted to the control unit 208, but rather to the voice codec circuit built in to the telephone circuit processing unit 209 for signal processing. Unit 209 consists of a voice codec and the telephone circuit as well as off-hook and on-hook test circuits (209*a*) and signaling tone generator circuit 209*b*, which generates dial tone and other such functions. Dial signal test circuit 209*c*, which is also included in 209, tests the dial signal transmitted from subscribers. Control unit 208, which includes a microprocessor, is used to control FSU 200. While location registration, transmitting, and receiving sequences are being carried out, unit 208 also monitors and controls data transmission between subscriber, telephone set, and base station. 208*a* controls information transmission to the base station. Memory 210 is composed of non-volatile memories, and is used to store a variety of information such as a list of base stations prioritized based on signal strength, base stations to which the FSUs tend to be assigned, and telephone numbers which, for example, the subscriber has dialed.

Figure 3:
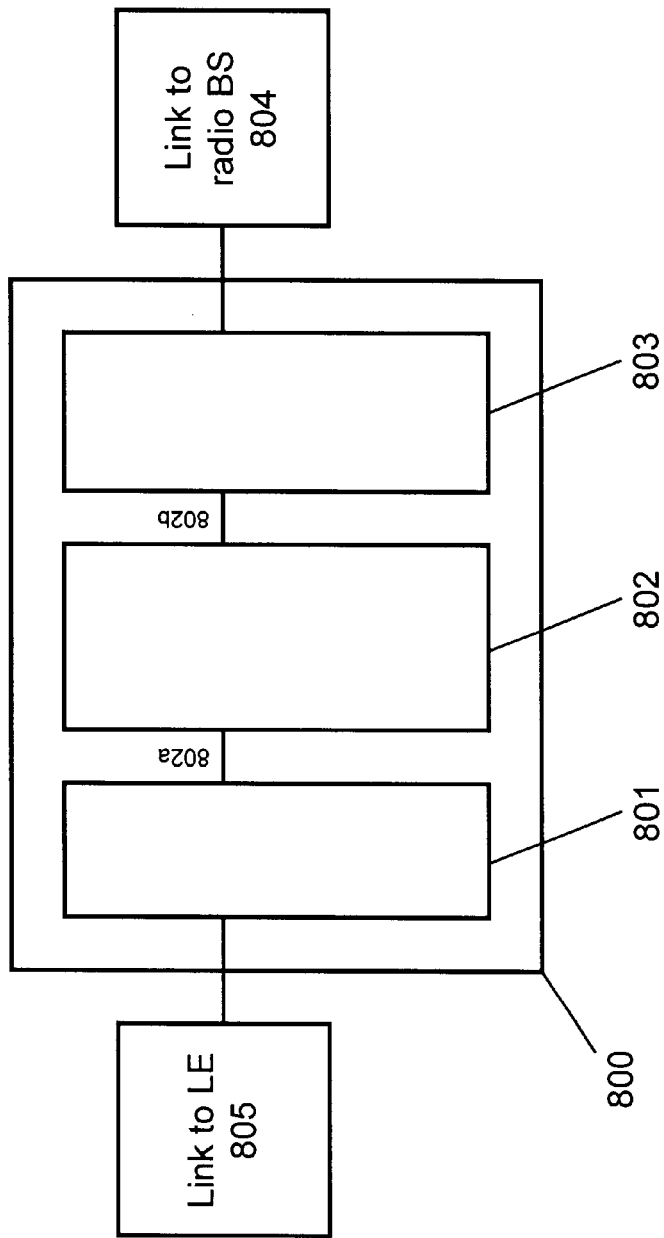
FIG. 3 shows a block diagram of a base station controller, according to an embodiment of the invention.

FIG. 3 shows a block diagram of a base station controller, according to an embodiment of the invention. Base station controller 800 is coupled to a link 805 to local exchange and to a link 804 to radio base station. Base station controller includes interface units 801, which couples local exchange and base station controller, control unit 802, and interface unit 803, which couples base station controller to the base station. Control unit 802 includes the function of determining whether an FSU may be assigned to a particular base station, and a function of determining to which additional base stations the FSU should attempt to be assigned and may include a complete list of base stations in prioritized order to which the FSU should attempt to be assigned. The base station controller may transmit the control message by the base station to accept the FSU's location registration or refuse it.

Figure 4:
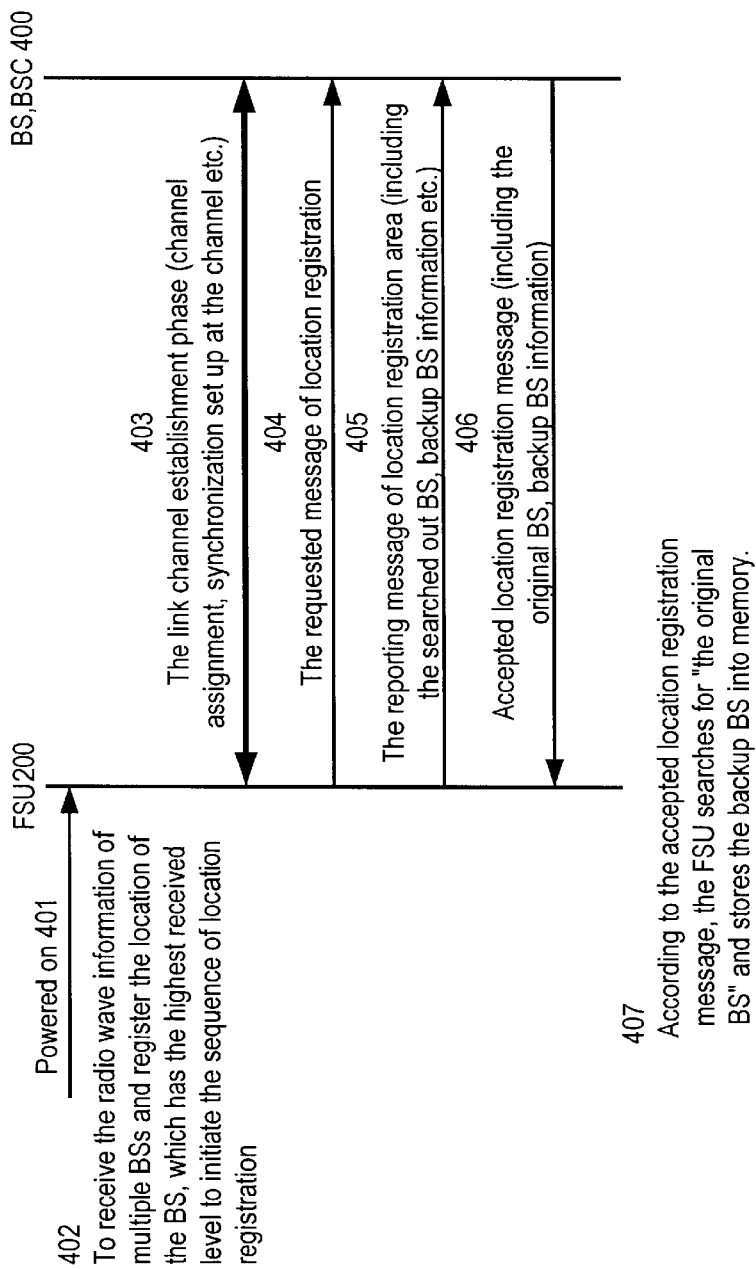
FIG. 4 shows a sequence chart of location registration after power on, according to an embodiment of the invention.

FIG. 4 shows a sequence chart of location registration after power on, according to an embodiment of the invention. Communication is shown between FSU 200 and the base station and base station controller, BS, BSC 400. First the FSU is powered on (line 401). The sequence chart shows a successful location registration, in which the base station accepts the location registration message from the FSU. After power on, the FSU receives radio wave information from surrounding base stations. This means that the FSU measures power of respective base stations. The FSU then determines the base station that has the highest signal strength and attempts to initiate location registration with that base station (block 402). Next, a channel of communications is established between FSU 200 and BS, BSC 400 (line 403). In this step, the link channel is established (channel assignment, synchronization set up at the channel, etc.). Next, FSU 200 sends a request message for location registration to BS, BSC 400 (line 404). FSU 200 sends a reporting message of location registration area to BS, BSC 400, and this message includes a list of base stations for which the FSU has measured signal strength and has ranked based on signal strength (line 405). BS, BSC 400 responds accepting location registration message (including the original base station and backup base station information) (line 406). The backup base stations returned from BS, BSC 400 may be a different list than the one sent by FSU 200 in the previous step. This list may be different depending on traffic patterns or other considerations as determined by equipment coupled to the base station, such as the base station controller. In response to the accepted location registration message, FSU 200 is now assigned to the original base station, that is the base station which FSU 200 originally tried to be assigned to (block 407). FSU 200 also stores the list of backup base stations in memory (block 407).

The FSU notifies the system as to the reason for location registration. A control unit in the FSU contains a portion which processes a notice function of the FSU's location registration. This function identifies the reason that the location registration should be implemented. Once the power supply of the FSU is switched on, sequence of location registration initiates. According to this feature, information regarding the reason for location registration is added during its sequence of location registration.

The base station controller determines whether it will implement location registration. In addition, the FSU attempts to be assigned to the base station provided by the base station controller. This feature may be implemented, for example, in a system as shown in FIG. 3. Control unit 802*a* provides the function of selecting whether to register location. Unit 802*a* causes a control message to be transmitted that will accept or refuse the FSU location registration attempt. Unit 802*b* notifies the FSU that the base station is implementing the location registration and also provides a list of other base stations to be used as backups. If the base station controller determines that the base station should not accept the location registration, the base station controller causes the base station to send a message to the FSU refusing the location registration.

The base station controller may cause the FSU to attempt to be assigned to another base station other than the original one to which it attempted to be assigned. In response to the location registration message from the FSU, the base station controller causes the base station to send a message to the FSU to attempt to be assigned to another base station. In response, the FSU attempts to be assigned to the other base station and stores such base station and backup base stations in memory.

Figure 5:
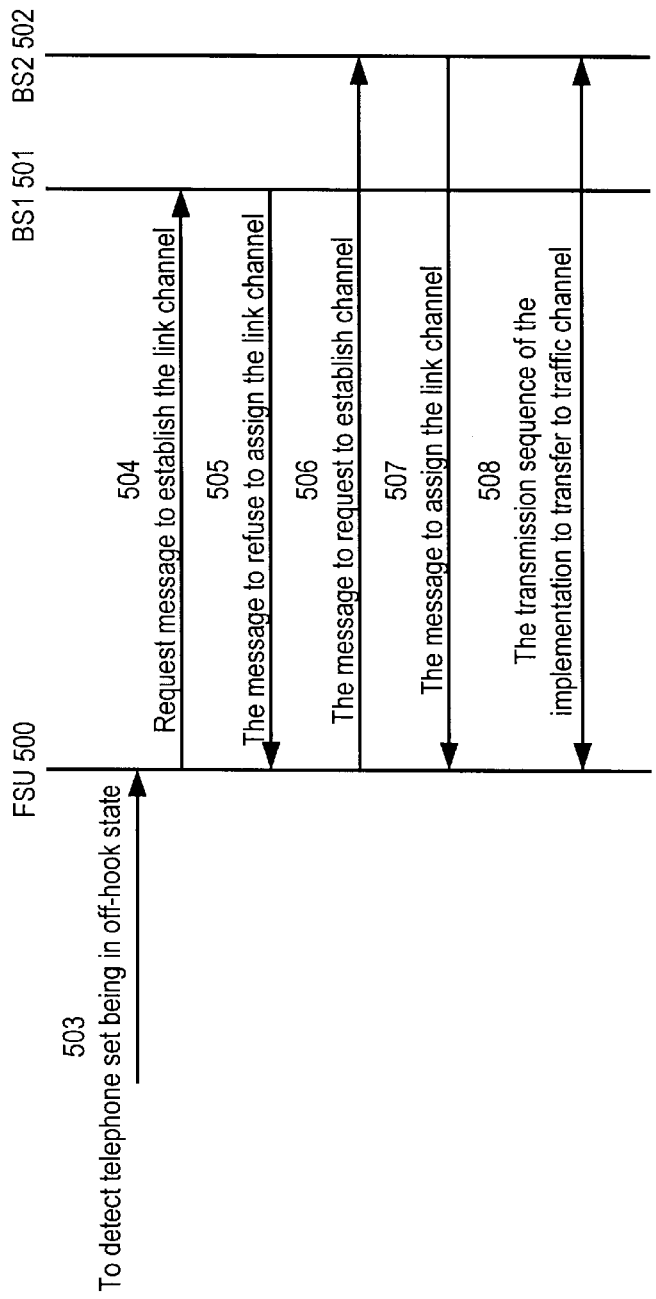
FIG. 5 shows a sequence chart of a transmission, according to an embodiment of the invention.

FIG. 5 shows a sequence chart of a transmission, according to an embodiment of the invention. When a user telephone set connected to the FSU is off hook and all the communication channels of the current base station are occupied, the FSU receives a message of refusing to transfer a channel from the base station. Next, a backup base station is initiated. As shown, first the telephone set is detected in an off hook state (line 503). Next, FSU 500 sends a message to the first base station, BS1 501 requesting the establishment of a link channel (line 504). BS1 501 responds with a message refusing to provide the link channel (line 505). Next, FSU 500 sends a message to a backup base station, BS2 502, requesting establishment of a link channel with that base station (line 506). Base station BS2 502 responds with a message providing the link channel (line 507). Next, a sequence initiates implementing transfer of the traffic channel (line 508).

Figure 6:
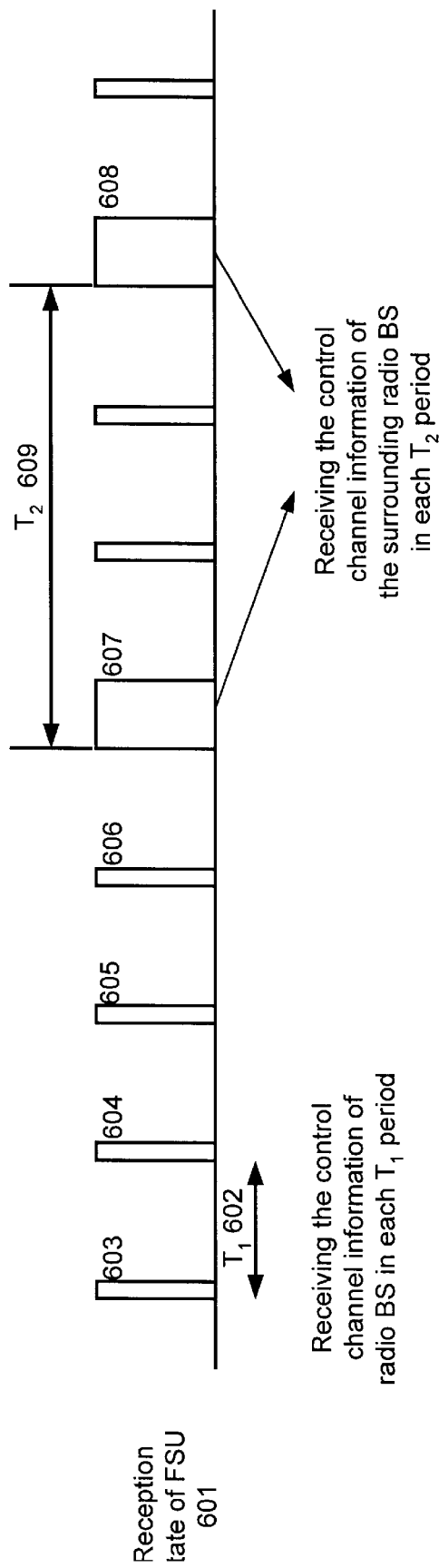
FIG. 6 shows a timing diagram for communication with a fixed subscriber unit, according to an embodiment of the invention.

FIG. 6 shows a timing diagram for communication with a fixed subscriber unit, according to an embodiment of the invention. The FSU automatically updates its information regarding signal strength of respective base stations and notifies the base station of this information. Such information regarding signal strength of the respective base stations is stored in memory at the FSU and is periodically transferred to the local base station. As shown, control information is received from the base station every $T_1$ 602 period. Every $T_2$ 609 period, control information is received from the other base stations regarding the signal strength of surrounding base stations that surround the FSU. Pulses 607 and 608 represent the FSU receiving such info from all such base stations. Pulses, for example, 603, 604, 605, and 606 represent the reception of control channel information from the base station to which the FSU is assigned.

Figure 7:
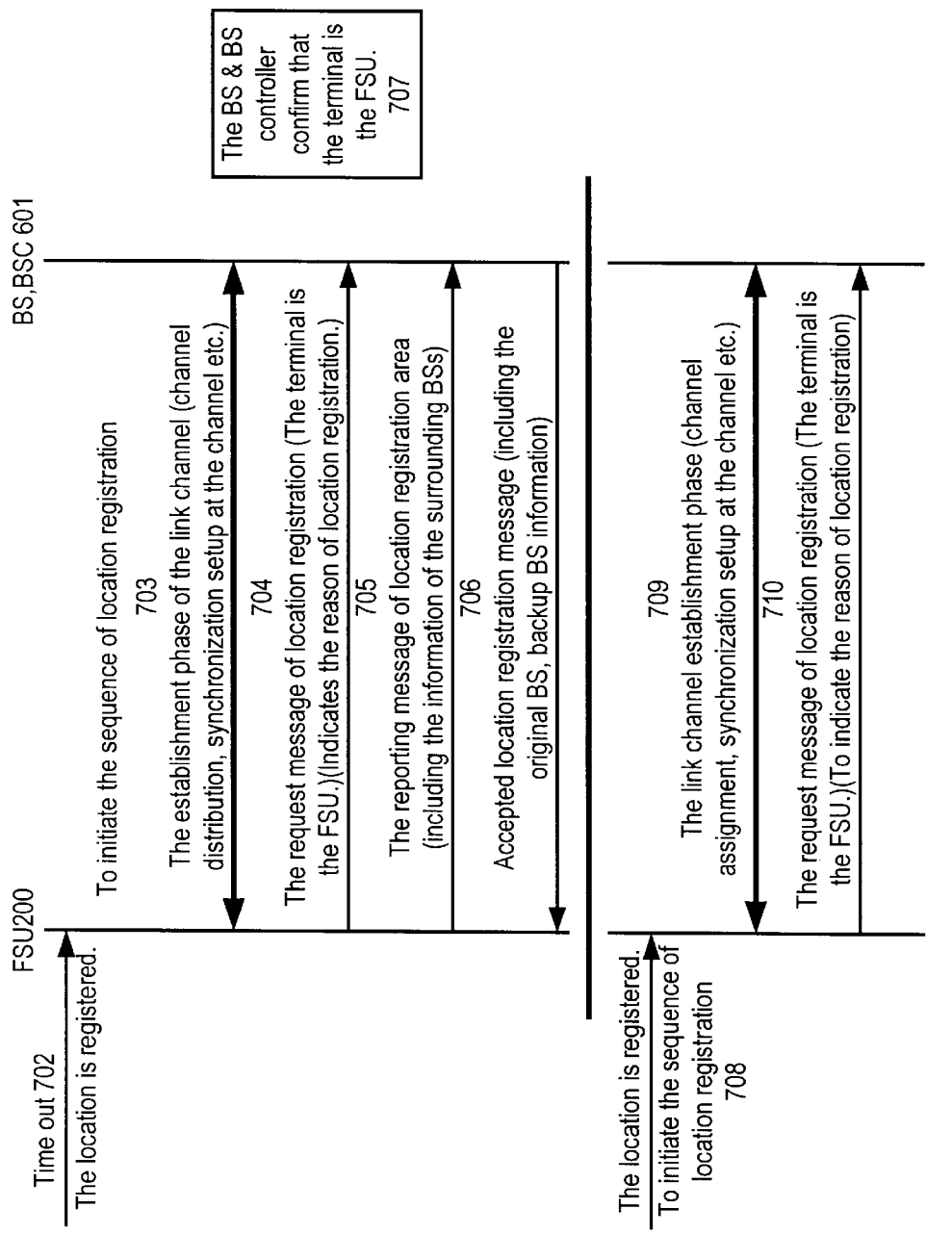
FIG. 7 shows a sequence chart for periodical location registration, according to an embodiment of the invention.

FIG. 7 shows a sequence chart for periodical location registration, according to an embodiment of the invention. A time out occurs and the location registration is initiated (line 702). First, the link channel is established (channel assignment, synchronization setup at the channel, etc.) (line 703). A message is sent from FSU 200 to BS, BSC 601 requesting location registration (line 704). The message indicates that the terminal is the FSU and the reason for the location registration. A reporting message of the location registration area is sent, from FSU 200 to BS, BSC 601, and this message includes information regarding the base stations surrounding the FSU (line 705). BS, BSC 601 responds accepting the location registration message and includes a list of base stations to which the FSU should attempt to be assigned (line 706). Later, the location is registered and the location registration sequence begins again (line 708). A link channel is established (channel assignment, synchronization setup at the channel, etc.) (line 709). A message requesting location registration is sent from FSU 200 to BS, BSC 601, and this message indicates that the terminal is an FSU and the reason for location registration (line 710).

Figure 8:
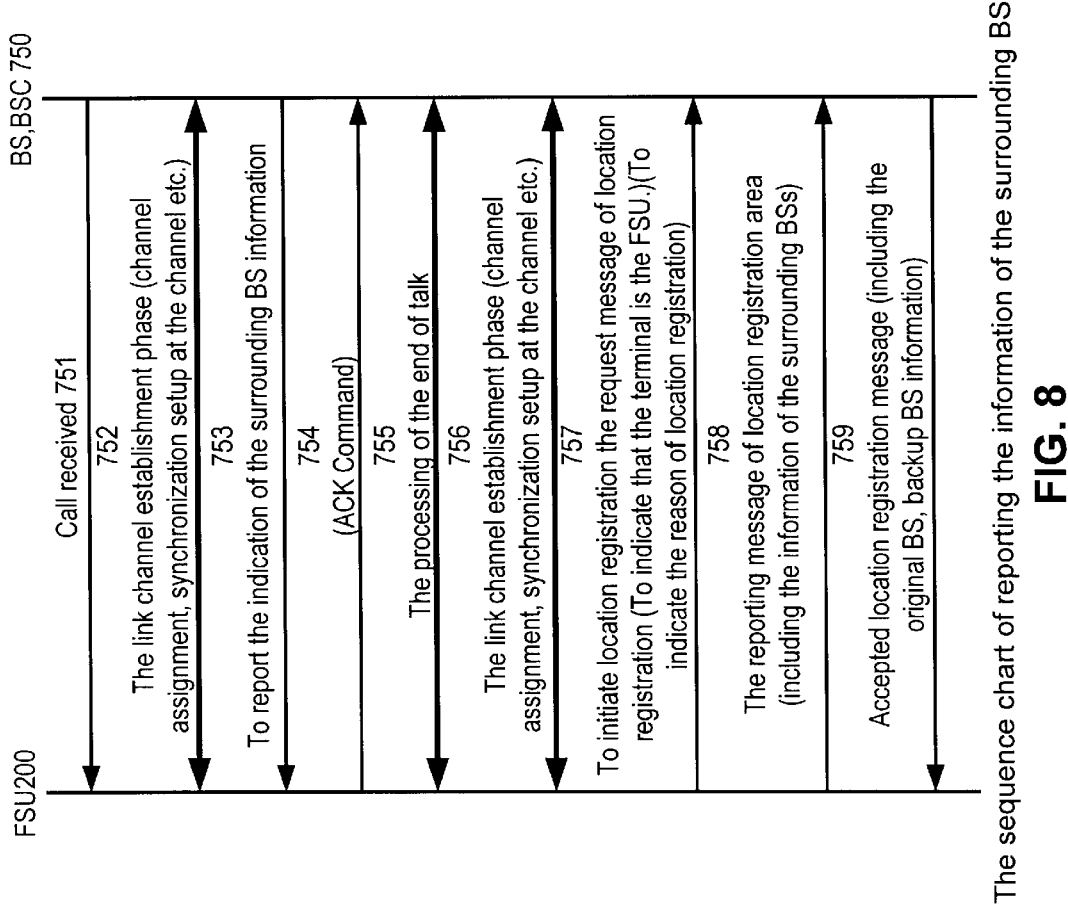
FIG. 8 shows a sequence chart for reporting information of surrounding base stations, according to an embodiment of the invention.

FIG. 8 shows a sequence chart for reporting information of surrounding base stations, according to an embodiment of the invention. The base station controller periodically reports the surrounding base station information to the FSU. This is carried out in the control component of the base station controller. The wireless local loop system initiates a request that the FSU report information regarding the surrounding base stations. The message sent to the FSU for it to provide such information is sent in a mode of non-alerting and auto-answering so that a WLL subscriber is not notified with a ringing signal for this purely control-related information exchange. After receiving the report of the surrounding base stations through such exchange, the FSU monitors the surrounding base stations and initiates a sequence of location registration and notifies the base station controller regarding the surrounding base stations. As shown, first a call is received by FSU 200 from BS, BSC 750 (line 751). Next, a link channel is established (line 752). BS, BSC 750 report information regarding surrounding base stations to FSU 200 (line 753). FSU 200 responds with an ACK command (line 754). The end of the call is processed (line 755). The link channel is established (line 756). FSU 200 initiates a location registration by sending a message to BS, BSC 750, indicating that the terminal is an FSU and the reason for the location registration (line 757). FSU 200 sends a reporting message regarding the location registration area that includes information regarding the surrounding base stations (line 758). BS, BSC 750 respond accepting the location registration message and include the original base station and backup base station information (line 759).

The base station controller sends a message to the FSU to change the base station to which the FSU is assigned according to information from the FSU regarding the surrounding base stations. The control component of the base station controller assigns the base station to which the FSU is to attempt to be assigned. A signal receiving function resides in the control component of the FSU to receive the information about the base station to which it should attempt to be assigned.

Figure 9:
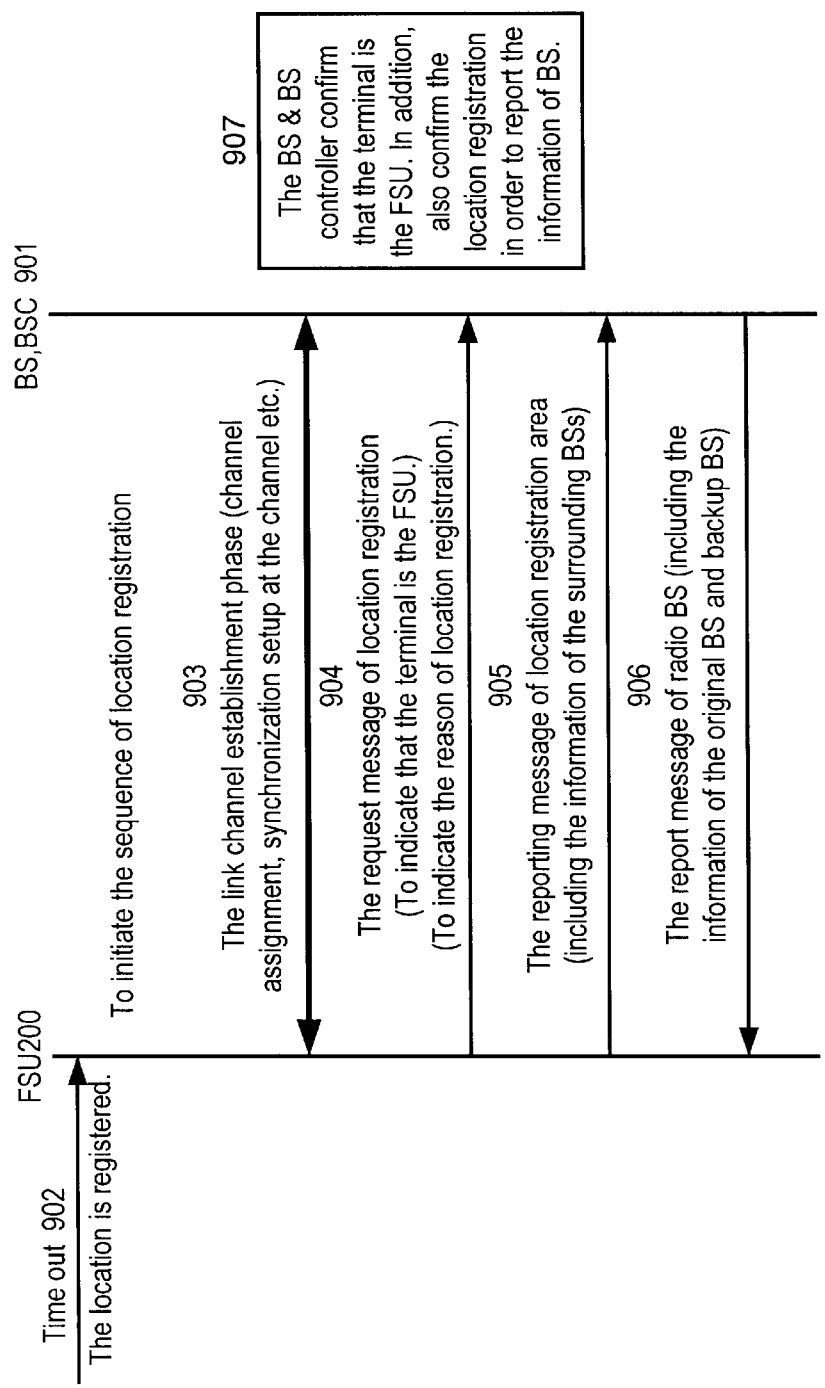
FIG. 9 shows a sequence chart of periodic location registration, according to an embodiment of the invention.

FIG. 9 shows a sequence chart of periodic location registration, according to an embodiment of the invention. As shown in FIG. 9, first a time out occurs (line 902). A link channel is established (channel assignment, synchronization set up at the channel, etc.) (line 903). This occurs between FSU 200 and BS, BSC 901. The FSU 200 sends a message requesting location registration indicating that the terminal is an FSU and the reason for the location of registration (line 904). The FSU provides to BS, BSC 901 information regarding the surrounding base stations (line 905). BS, BSC 901 responds with a support message of the base station to which the FSU should attempt to be assigned including the original base station and the backup base station (block 906).

Figure 10:
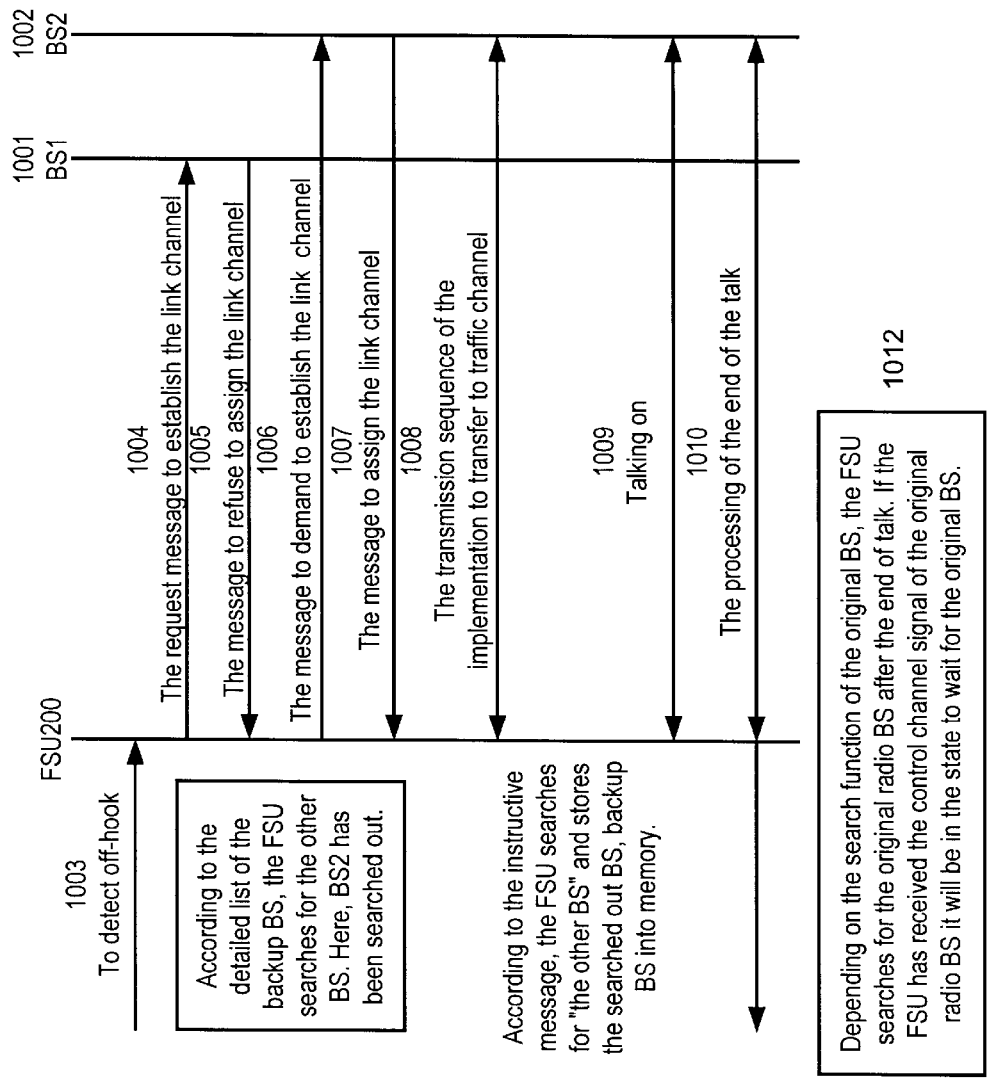
FIG. 10 shows a sequence chart of return to the original base station after an end of talk transfer, according to an embodiment of the invention.

FIG. 10 shows a sequence chart of return to the original base station after an end of talk transfer, according to an embodiment of the invention. A message is sent to the FSU indicating that the FSU should attempt to be assigned to another base station, and this message is sent in a non-ringing (non-alerting) control format. The control component of the FSU receives the information regarding the change of base station and the non-ringing control information. The FSU attempts to be assigned to the original base station after the current communication is concluded using a base station other than the original base station. First, FSU 200 detects an off hook condition (line 1003). A message is sent to the original base station, BS 11001 to establish the link channel (line 1004). The original base station refuses to provide the link channel and sends such a message to FSU 200 (line 1005). Then, the FSU 200 sends a message demanding establishment of link channel with other than the original base station, BS2 1002 (line 1006). The other base station, BS2 1002, responds with a message to provide the link channel (line 1007). A transmission sequence then initiates between the other base station and FSU 200 (line 1008). Such transmission sequence implements the transfer of the traffic channel. Next, talking is on between FSU 200 and the other base station, BS2 1002. Eventually the end of the call is processed (line 1010). Depending on the search function of the original base station, the FSU searches for the original base station after the end of the call. If the FSU has received the control channel signal of the original base station, it will be in a wait state for the original base station, in which it is ready to communicate with the original base station upon receipt of an incoming call or placement of an outgoing call.

Figure 11:
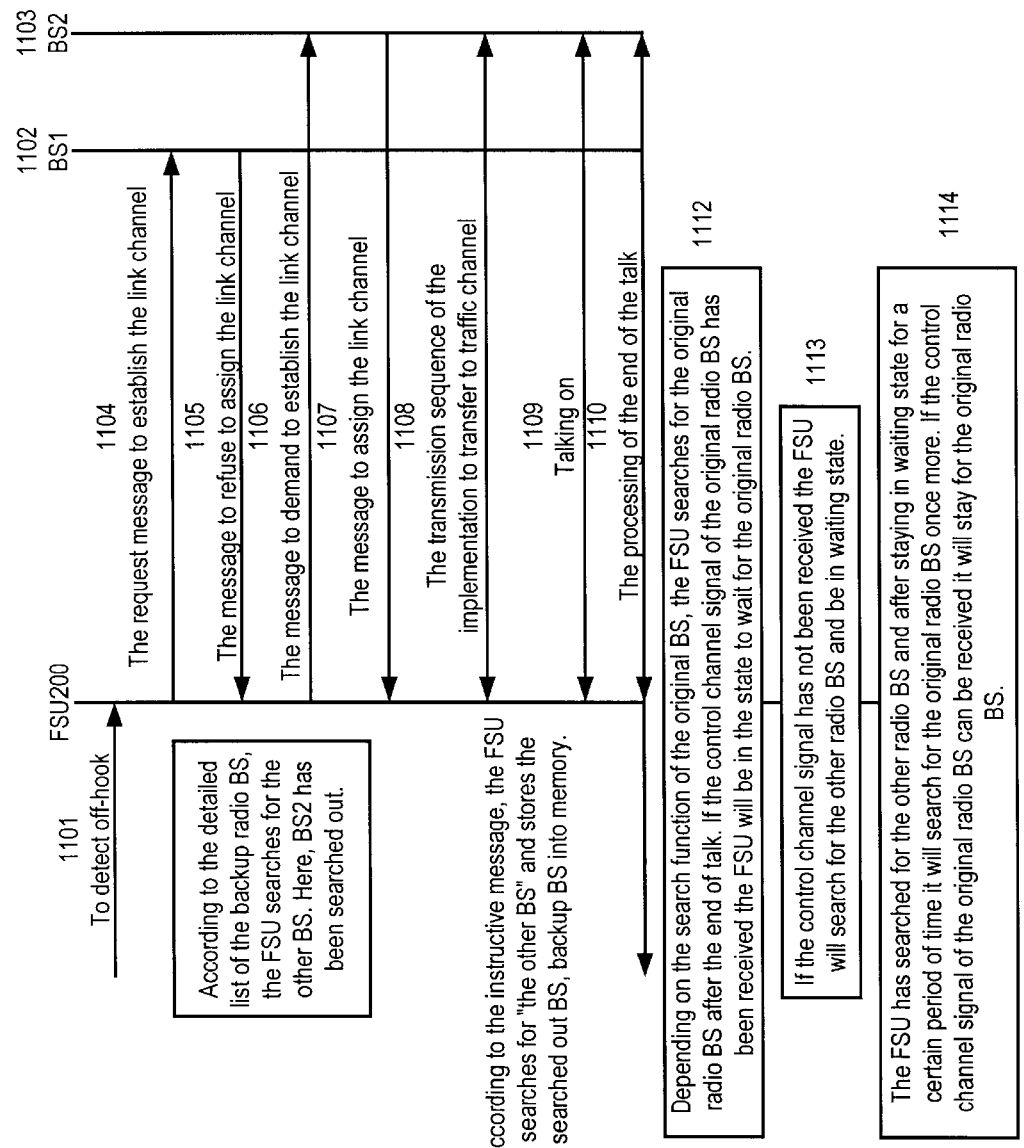
FIG. 11 shows a sequence chart of return to the original base station after end of talk transfer, according to an embodiment of the invention.

FIG. 11 shows a sequence chart of return to the original base station after end of talk transfer, according to an embodiment of the invention. The FSU continues to attempt to be assigned to the original base station. This is carried out in the control unit of the FSU. The FSU attempts to be assigned to the original base station as soon as the communication is concluded with the alternative base station. If it is not possible for the FSU to be assigned to the original base station, the FSU will assign itself to another base station temporarily and stay in the wait state with that base station. The FSU initiates an attempt to be assigned to the original base station repeatedly every time interval as shown FIG. 11. Once the FSU has obtained an assignment to the original base station, the FSU stays in a wait state with the original base station.

As shown in FIG. 11, first the FSU 200 detects an off-hook state (line 1101). FSU 200 sends a request for a link channel to the first base station BS1 1102 (line 1104). The first base station refuses to provide the link channel to FSU 200 and sends a message to FSU 200 indicating that (line 1105). Next, FSU 200 sends a message to demand the link channel from the other base station, BS2 1003 (line 1106). The other base station, BS2 1103, responds with a message to provide the link channel to FSU 200 (1107). Next, a transmission sequence is initiated implementing the transfer of the traffic channel (line 1108). Talking is then on between FSU 200 and BS2 1103 (line 1109). Eventually, the end of the call occurs and this is processed between FSU 200 and BS2 1103 (line 1110). Next, depending on the search function of the original base station, the FSU searches for the original base station after the end of the call. If the FSU is successful in being assigned to the original base station, it will enter a wait state with the original base station (block 1112). Otherwise, if a control channel signal indicating that the FSU may be assigned to the original base station is not received from the original base station, the FSU searches for other base stations and enters a waiting state when one is found, waiting for incoming or outgoing calls (block 1113). After the FSU has been assigned to another base station and has remained in a waiting state for a particular period of time, it attempts again to be assigned to the original base station again. If a control channel signal is received from the original base station allowing the FSU to be assigned to it, the FSU will stay in a wait state with the original base station (block 1114).

Figure 12:
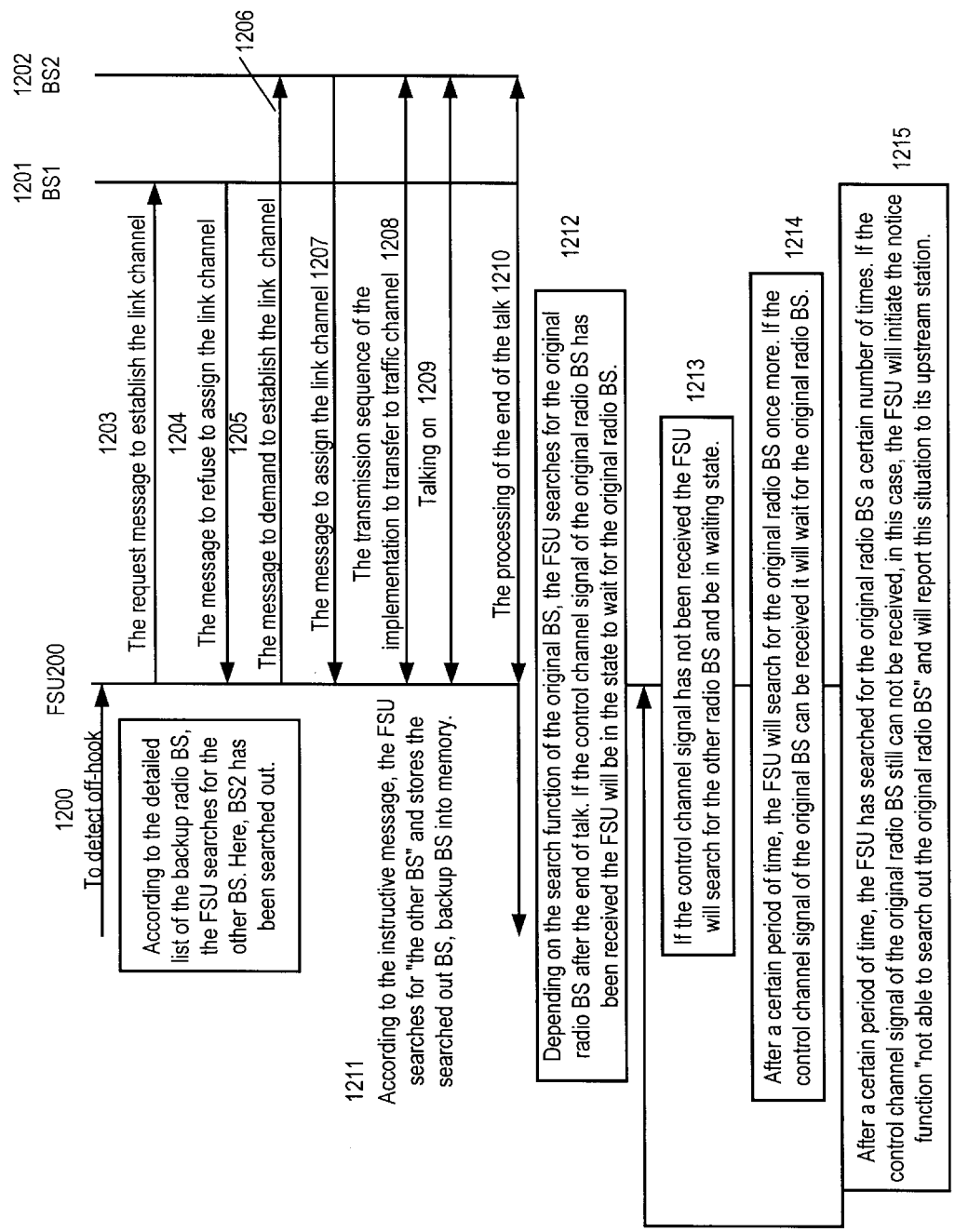
FIG. 12 shows a sequence chart of return to the original base station after end of a talk transfer, according to an embodiment of the invention.

FIG. 12 shows a sequence chart of return to the original base station after end of a talk transfer. An off-hook state is detected by the FSU 200 (line 1200). A message is sent to the original base station BS1 1201 requesting a link channel (line 1203). The original base station refuses to provide the link channel (line 1204). In response FSU 200 sends a message to another base station, BS2 1202, requesting a link channel (line 1205). The other base station, BS2 1202, sends a message providing a link channel to FSU 200 (line 1207). A transmission sequence initiates between FSU 200 and BS2 1202 (line 1208). A call is initiated with talking between the base station and FSU 200 (line 1209). Eventually the call ends and this is processed between the base station and FSU (line 1210).

Depending on the search function of the original base station, the FSU attempts to be assigned to the original base station after the end of the call. If the FSU is permitted to be assigned to the original base station, the FSU does so and enters a wait state (block 1212). If the FSU is not permitted to be assigned to the original base station, then the FSU searches for another base station and enters a waiting state with such other base station (line 1213). After a certain time period, the FSU again attempts to be assigned to the original base station. If the control channel signal of the original base station is received allowing the FSU to be assigned to that base station, the FSU enters a waiting state with that original base station (block 1214). After a certain period of time the FSU has attempted to be assigned to the original base station a certain number of times. If the control channel signal indicating the FSU may be assigned to the original base station has still not been received, the FSU initiates a notice function that it cannot be assigned to the original base station and this message is reported to an upstream station, such as the base station controller (block 1215). Next, return to block 1213.

Figure 13:
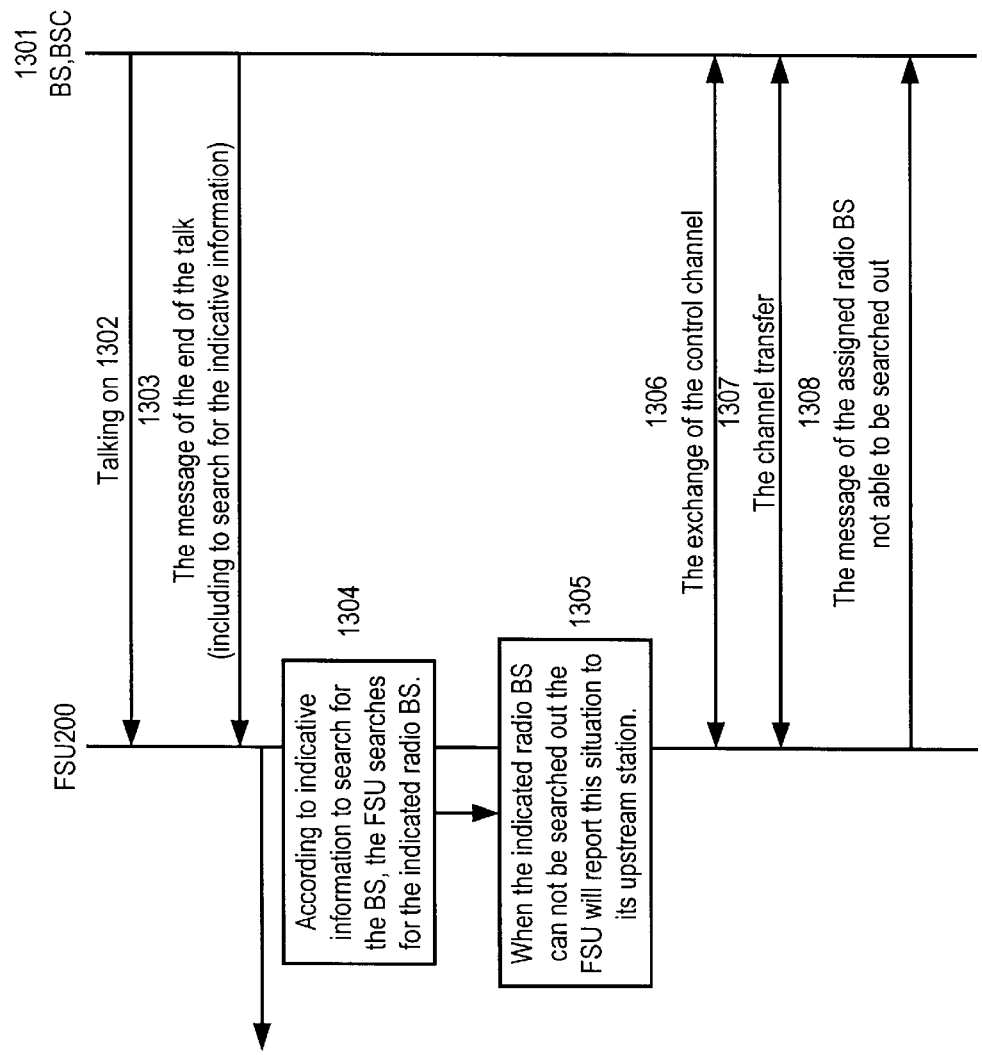
FIG. 13 shows an indicative sequence chart of searching for another radio base station, according to an embodiment of the invention.

FIG. 13 shows an indicative sequence chart of searching for another radio base station, according to an embodiment of the invention. First talking is on between FSU 200 and BS, BSC 1301 (line 1302). Eventually a message regarding the end of the call is received, eg, from BS, BSC 1301 (line 1303). A message is received from BS, BSC 1301 indicating which base station should be searched for by FSU 200 (block 1304). If the FSU cannot be assigned to the indicated base station, the FSU reports the situation to its upstream station (line 1305). Eventually a control channel is exchanged between FSU 200 BS, BSC 1301 (line 1306). A control channel is transferred between these entities (line 1307). The FSU 200 responds with the message of the base station to which it was not able to be assigned (block 1308).

The foregoing description of various embodiments of the invention has been presented for purposes of illustration and description. It is not intended to limit the invention to the precise forms disclosed.

What is claimed is:

1. In a system including a plurality of wireless fixed subscriber units (FSUs) each coupled to a subscriber communication device, each FSU configured to communicate wirelessly with at least a base station, the system including a plurality of base stations, the base stations coupled to a telecommunications network, a method of assigning an FSU to communicate with a particular base station, the method comprising:

the FSU measuring signal strength of a set of base stations;

the FSU sending a message with the measured signal strength of the set of base stations to a base station;

circuitry coupled to the base station determining at least a base station to which the FSU is to be assigned based on the message and additional information in the circuitry coupled to the base station including usage patterns for the base stations; and in response to the determining by the circuitry coupled to the base station, the base station sending to the FSU a message including the base station to which the FSU is to be assigned.

2. The method of claim 1, wherein the additional information in the circuitry coupled to the base station comprises measured signal strength of base stations sent by FSUs other than the FSU.

3. The method of claim 1, wherein the additional information in the circuitry comprises information regarding availability of base stations to additional FSUs.

4. The method of claim 1, including the FSU repeatedly measuring signal strength of surrounding base stations, the FSU sending a message with the measured signal strength to a base station, and in response to the message, the base station sending an updated list of base stations to which the FSU may be assigned.

5. The method of claim 1, including the FSU establishing communication with the base station to which it is to be assigned.

6. The method of claim 1, including the FSU maintaining a prioritized list of base stations to which the FSU is to be assigned.

7. The method of claim 6, wherein the prioritized list is first based on measured signal strength of the base stations, and is then updated in response to a message from the base station.

8. The method of claim 7 wherein the message from the base station includes a new prioritized list of base stations, and the FSU replaces the prioritized list of base stations with the new prioritized list of base stations from the base station.

9. The method of claim 6, wherein the FSU attempts to achieve an assignment with the highest prioritized base station on the list and if the FSU is not able to achieve the assignment with the highest prioritized base station, the FSU achieves an assignment with another base station and later attempts to achieve an assignment with the highest prioritized base station.

10. The method of claim 1, including applying, for radio communication between the FSU and the base station, an interface of PHS that conforms with a Radio Control Regulation Standard 28 (RCR STD-28) radio interface defined by Association of Radio Industries and Businesses (ARIB).

11. The method of claim 1, including applying a DECT radio interface protocol for radio communication between the FSU and the base station.

12. The method of claim 1, including applying a PACS radio interface protocol for radio communication between the FSU and the base station.

13. The method of claim 1, including applying a GSM radio interface protocol for radio communication between the FSU and the base station.

14. The method of claim 1, including applying a AMPS radio interface protocol for radio communication between the FSU and the base station.

15. The method of claim 1, including applying a CDMA radio interface protocol for radio communication between the FSU and the base station.

16. The method of claim 1, wherein the telecommunications network comprises a public telephone switched telephone network (PSTN).

17. The method of claim 1, wherein the circuitry coupled to the base station comprises a base station controller.

18. The method of claim 17, wherein the base station controller is coupled to a local exchange of a public telephone switched telephone network (PSTN).

19. The method of claim 18, wherein the interface over which the base station controller is coupled to the PSTN comprises a Mercury TI067 interface.

20. The method of claim 1, wherein the subscriber communications device comprises a common telephone set.

21. The method of claim 1, wherein the FSU comprises a radio circuit, radio controller, channel coder/decoder (CODEC), telephone line processor, and memory.

22. A communications system comprising:

a plurality of base stations, the base stations coupled to a telecommunications network, a plurality of subscriber communication devices, a plurality of wireless fixed subscriber units (FSUs), each subscriber communication device coupled to an FSU, each FSU configured to communicate wirelessly with at least a base station, each FSU including circuitry that measures signal strength of a set of base stations and sends a message with the measured signal strength of the set of base stations to a base station; and circuitry coupled to the base stations that determines at least a base station to which an FSU is to be assigned based on the message and additional information in the circuitry coupled to the base station including usage patterns for the base stations and in response to the determining causes the base station to send to the FSU a message including the base station to which the FSU is to be assigned.

23. The system of claim 22, the FSU including circuitry that repeatedly measures signal strength of surrounding base stations and sends a message with the measured signal strength to a base station, to which message the base station responds with an updated list of base stations to which the FSU may be assigned.

24. The system of claim 22, the FSU including a prioritized list of base stations to which the FSU is to be assigned.

25. The system of claim 24, wherein the FSU includes circuitry to first prioritize the list based on measured signal strength of the base stations, and then update the list in response to a message from the base station wherein the message from the base station includes a new prioritized list of base stations.

26. The system of claim 24, wherein the FSU includes circuitry that attempts to achieve an assignment with the highest prioritized base station on the list and if the FSU is not able to achieve the assignment with the highest prioritized base station, that achieves an assignment with another base station and later attempts to achieve an assignment with the highest prioritized base station.

27. The system of claim 22, the FSU including a PHS radio interface that conforms with a Radio Control Regulation Standard 28 (RCR STD-28) radio interface defined by Association of Radio Industries and Businesses (ARIB).

28. The system of claim 22, the FSU including a DECT radio interface.

29. The system of claim 22, the FSU including a PACS radio interface.

30. The system of claim 22, the FSU including a GSM radio interface.

31. The system of claim 22, the FSU including a AMPS radio interface.

32. The system of claim 22, the FSU including a CDMA radio interface.

33. The system of claim 22, including an interface to a public telephone switched telephone network (PSTN).

34. The system of claim 22, wherein the circuitry coupled to the base stations that determines at least a base station to which an FSU is to be assigned comprises a base station controller.

35. The system of claim 34, wherein the base station controller is coupled to a local exchange of a public telephone switched telephone network (PSTN).

36. The system of claim 35, wherein the interface over which the base station controller is coupled to the PSTN comprises a ITU V5Mercury TI067 interface.

37. The system of claim 22, wherein the subscriber communications device comprises a common telephone set.

38. The system of claim 22, wherein the FSU comprises a radio circuit, radio controller, channel coder/decoder (CODEC), telephone line processor and memory.

39. An apparatus for use in a telecommunications system, the apparatus comprising:
  circuitry that
    determines at least a base station to which a wireless fixed subscriber unit (FSU) is to be assigned in response to (a) a message from the FSU including measured signal strength of a set of base stations and (b) additional information including usage patterns of the base stations, wherein the measured signal strength is measured by the FSU and
    causes a base station communicating with the FSU to send a message including the base station to which the FSU is to be assigned.

40. The apparatus of claim 39, wherein the additional information comprises measured signal strength of base stations sent by FSUs other than the FSU.

41. The apparatus of claim 39 including circuitry that, in response to subsequent messages from the FSU with updated signal strength of surrounding base stations, causes a message to be sent to the FSU, the message responding with an updated list of base stations to which the FSU may be assigned.

42. The apparatus of claim 39, wherein the circuitry causes a message to be sent to the FSU, the message including a prioritized list of base stations to which the FSU may be assigned.

43. The apparatus of claim 39, including base station control circuitry.

44. A wireless fixed subscriber unit (FSU) comprising:
  an interface to a subscriber communication device,
  a wireless base station interface;
  circuitry that
    measures signal strength of a set of base stations,
    sends a message with the measured signal strength of the set of base stations to a base station,
    receives a message from the base station including a base station to which the FSU is to be assigned based on the message sent to the base station and based on additional information including usage patterns of the base stations; and
    attempts to achieve an assignment to the base station sent in the message from the base station.

45. The FSU of claim 44, wherein the circuitry:
  repeatedly measures signal strength of surrounding base stations and
  sends a message with the measured signal strength to a base station, to which message the base station responds with an updated list of base stations to which the FSU may be assigned.

46. The FSU of claim 44 including a prioritized list of base stations to which the FSU is to be assigned.

47. The FSU of claim 46, the FSU including circuitry to first prioritize the list based on measured signal strength of the base stations, and then update the list in response to a message from the base station wherein the message from the base station includes a new prioritized list of base stations.

48. The FSU of claim 46, wherein the circuitry attempts to achieve an assignment with the highest prioritized base station on the list and if the circuitry is not able to achieve the assignment with the highest prioritized base station, the circuitry achieves an assignment with another base station and later attempts to achieve an assignment with the highest prioritized base station.

49. The FSU of claim 44 including a PHS radio interface that conforms with a Radio Control Regulation Standard 28 (RCR STD-28) radio interface defined by Association of Radio Industries and Businesses (ARIB).

50. The FSU of claim 44 including a DECT radio interface.

51. The FSU of claim 44 including a PACS radio interface.

52. The FSU of claim 44 including a GSM radio interface.

53. The FSU of claim 44 including a AMPS radio interface.

54. The FSU of claim 44 including a CDMA radio interface.

55. The FSU of claim 44 including a radio circuit, radio controller, channel coder/decoder (CODEC), telephone line processor and memory.

* * * * *